Feb. 25, 1930.  J. R. GUSTAFSSON  1,748,343

GRINDING APPARATUS

Filed June 1, 1926

Inventor:
Johan Richard Gustafsson
by George Bayard Jones,
Attorney.

Patented Feb. 25, 1930

1,748,343

UNITED STATES PATENT OFFICE

JOHAN RICHARD GUSTAFSSON, OF HVETLANDA, SWEDEN, ASSIGNOR OF ONE-FOURTH TO CARL-GUNNAR WICTORIN, OF HVETLANDA, SWEDEN

GRINDING APPARATUS

Application filed June 1, 1926, Serial No. 112,833, and in Sweden August 9, 1922.

The present invention relates to a grinding apparatus which is particularly adapted for grinding link and connecting rod crank pins on locomotive wheels as well as journals on wheels for railway cars and the like. The apparatus comprises a spindle or shaft which is adapted to be clamped in the axial direction of the pin or journal against the plane end surface of the pin or journal which surface is perpendicular to the axis of the pin or journal, and a holder or the like for a grinding disk or the like which holder is rotatable on said spindle or shaft. The main feature of the present invention consists in that the spindle or shaft is provided with a plane surface perpendicular to the axis of the spindle or shaft and adapted to bear against the plane end surface of the pin or journal, and that the clamping device consists of an outer brace or cross-piece which supports the outer end of the spindle or shaft, and which is connected by means of stay bolts with a corresponding brace or cross-piece placed against the inner side of the wheel. The stay bolts preferably engage the braces by means of convex surfaces on the heads and nuts of said bolts, or on washers placed on the same, or by means of other devices which allow a certain relative movement between the said members. By these arrangements the clamping of the spindle against the pin or journal can be securely and yet conveniently effected, and it is also easy to adjust the spindle in axial alignment with the pin or journal.

Figure 1:
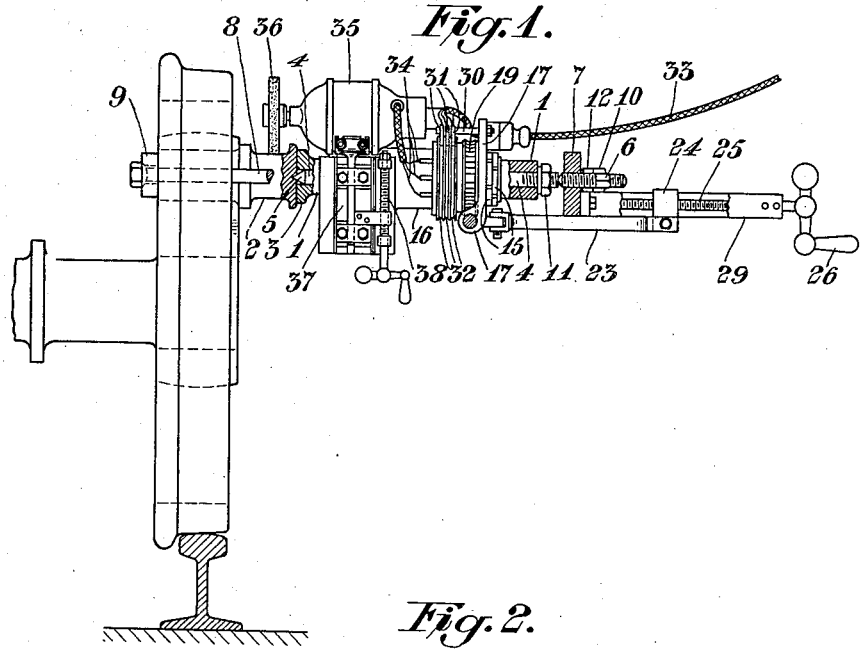
Figure 2:
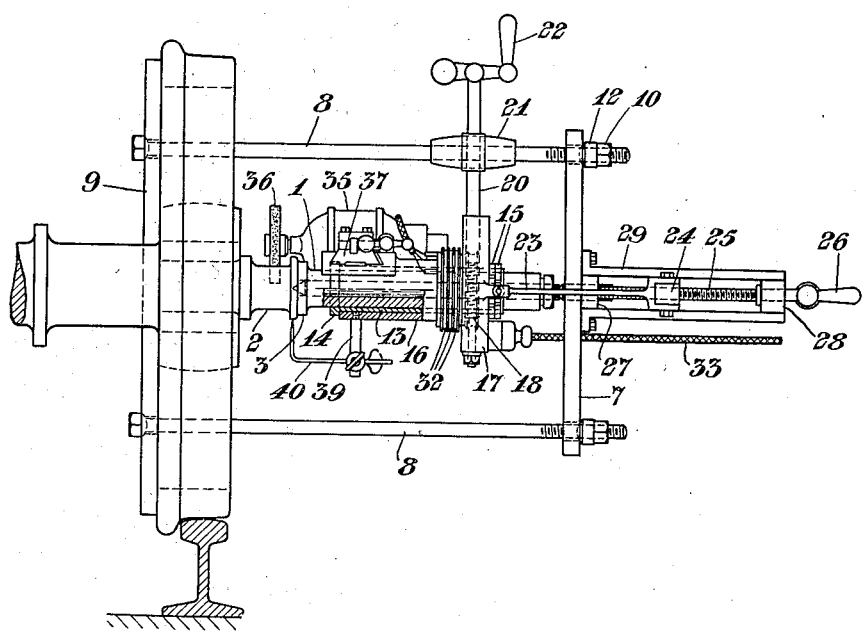

An embodiment of a grinding apparatus according to the present invention is illustrated by way of example in the accompanying drawing, in which Fig. 1 shows the apparatus viewed from one side, and Fig. 2 shows the apparatus viewed from below in Fig. 1.

The apparatus comprises a spindle or shaft 1 which is to be clamped to the crank pin 2 in axial alignment with the same. For this purpose said spindle 1 is provided with a head 3 of larger diameter and having a plane end surface which is perpendicular to the axis of the spindle, and which shall bear against the plane end surface of the crank pin. The spindle has an axial bore in which is placed a pin 4 coaxial with the spindle and provided with a point 5 which is intended to be placed in the center punch mark usually provided in the end surface of the crank pin. The other or outer end of the pin 4 is also provided with a center punch mark in which the point of a set screw 6 is introduced, said set screw being screw-threaded into the outer brace or cross-piece 7. Said brace 7 is connected through the stay bolts 8 with the inner brace or cross-piece 9 which is placed against the inner side of the wheel, the bolts 8 being placed between the spokes of the wheel. By tightening the nuts 10 on the bolts 8 the pin 4 will of course be jammed between the set screw 6 and the crank pin 2. The outer end of the pin 4 is screw-threaded and carries a nut 11. By drawing this nut 11 tight against the outer end of the spindle 1 said spindle is slid on the pin 4 towards the crank pin 2, so that the end surface on the head 3 of the spindle is brought to bear against the end surface of the crank pin, so that the spindle becomes accurately adjusted in axial alignment with the crank pin. In order to facilitate such change of position of the brace 7 as might be required for such adjustment, the stay bolts 8 engage the braces 7 and 9 by means of convex surfaces on their heads and nuts or, as in the instance shown, washers 12. It will be understood, however, that for this purpose other devices may be used which allow a certain relative movement between the stay bolts and the braces.

A sleeve 13 is slidable on the spindle 1. Between a flange 14 at one end of the sleeve 13 and nuts 15 screw-threaded onto the other end of said sleeve there are mounted a support 16 rotatable on said sleeve and a bearing 17 for a worm 18 which meshes with a worm wheel 19 secured to the support 16. The shaft 20 of the worm 18 is also journalled in a bearing 21 which is slidable on one of the stay bolts 8, and the outer end of said shaft carries a crank or handle 22 by means of which the worm may be rotated. The bearing 17 is connected through a link 23 with a nut 24 on a screw 25 which is rotatable by means of a handle or crank 26 but is not movable longitudinally in blocks 27 and 28 carried by stays 29 secured to the outer brace 7, said stays 29 also serving as guides for the nut 24. By rotating said screw 25 the nut 24 will be moved in the longitudinal direction of the screw, and this movement is transmitted through the link 23 to the bearing 17, and the sleeve 13 will thus be moved axially on the spindle 1. The bearing 17 carries a holder 30 for brushes 31 through which electric current is supplied to slip rings 32 which are carried by and insulated from the support 16. The brushes 31 receive current from a cable 33, and the current is conducted from the slip rings 32 through cables 34 to the electric motor 35 on the shaft of which the grinding disk 36 is mounted. Said motor 35 is mounted on a slide 37 which is movable on the support 16 transversely to the axis of the spindle 1 by means of the screw 38, so that the grinding disk 36 may be moved towards and away from the crank pin 2.

When the apparatus has been clamped against the crank pin 2 in the manner above described, the motor 35 is started, and the grinding disk 36 is adjusted towards the crank pin 2 by means of the screw 38. By rotating the worm 18 by means of the crank 22 the support 16 carrying the motor 35 and grinding disk 36 is rotated on the sleeve 13, the brushes 31 and slip rings 32 transmitting the current to the motor. Simultaneously the grinding disk is gradually fed in the longitudinal direction of the crank pin 2 by moving the sleeve 13 axially on the spindle 1 by rotating the screw 25 by means of the crank 26.

The support 16 carries a stud 39 on which a marking tool 40 is secured. By adjusting the point of said tool against the circumference of the outer flange of the crank pin 2, and by rotating the support 16, it is possible before starting to grind to check whether the apparatus has been correctly mounted in alignment with the crank pin. Such checking is particularly advantageous when the crank pin 2 is not provided with a center punch mark in which the point 5 of the pin 4 can be introduced.

It will be understood that the invention is not limited to the embodiment above described and illustrated in the drawing, since the various details of said embodiment are capable of change and modification in several respects within the scope of the invention as defined in the accompanying claims.

I claim:

1. In a grinding apparatus for grinding crank pins and journals on locomotive and railway car wheels, the combination of a spindle having a plane end surface perpendicular to the axis of the spindle, a support for a grinding tool rotatable on said spindle, and means for clamping said spindle to such crank pin in axial alignment therewith and with said plane end surface of the spindle bearing against the plane end surface of the crank pin, said clamping means comprising an outer brace adapted to support the outer end of said spindle and having a rocking engagement therewith, a second brace adapted to be placed against the wheel, and stay bolts connecting said two braces.

2. In a grinding apparatus for grinding crank pins and journals on locomotive and railway car wheels, the combination of a spindle having a plane end surface perpendicular to the axis of the spindle, a support for a grinding tool rotatable on said spindle, and means for clamping said spindle to such crank pin in axial alignment therewith and with said plane end surface of the spindle bearing against the plane end surface of the crank pin, said clamping means comprising an outer brace adapted to support the outer end of said spindle and having a rocking engagement therewith, a second brace adapted to be placed against the wheel, and stay bolts connecting said two braces, said stay bolts having convex surfaces engaging said braces.

3. In a grinding apparatus for grinding crank pins and journals on locomotive and railway car wheels, the combination of a spindle having a plane end surface perpendicular to the axis of the spindle, said spindle being tubular, a support for a grinding tool rotatable on said tubular spindle, a pin in said tubular spindle, said pin having a pointed end adapted to be inserted in a center punch mark in the end surface of the crank pin, means for clamping said spindle in axial alignment with such crank pin with said plane end surface of the spindle bearing against the plane end surface of the crank pin, said clamping means comprising an outer brace adapted to support the outer end of said pin and having a rocking engagement therewith, a second brace adapted to be placed against the side of the wheel opposite the crank pin, and stay bolts connecting said two braces, the outer end of said pin being screw-threaded, and a nut on said screw-threaded outer end of said pin adapted to engage the outer end of said spindle.

4. In a grinding apparatus for grinding crank pins and journals on locomotive and railway car wheels, the combination of a tubular spindle having a plane end surface perpendicular to the axis of the spindle, a support for a grinding tool rotatable on said tubular spindle, a pin in said tubular spindle having a pointed end adapted to be inserted in a center punch mark in the end surface of the crank pin, the other end of said pin being screw-threaded, a nut on said screw-threaded end of said pin adapted to engage the outer end of said spindle, means for clamping said spindle to the crank pin in axial alignment therewith and with said plane end surface of the spindle bearing against the plane end surface of the crank pin, said clamping means comprising an outer brace adapted to support the outer end of said pin, a second brace adapted to be placed against the side of the wheel opposite the crank pin, stay bolts connecting said two braces, and a set screw in said outer brace engaging the outer end of said pin.

5. In a grinding apparatus for grinding crank pins and journals on locomotive and railway car wheels, the combination of a spindle having a plane end surface perpendicular to the axis of the spindle, a sleeve slidable longitudinally on said spindle, means for sliding said sleeve on said spindle, a support for a grinding tool rotatable on said sleeve, a worm wheel attached to said support, a worm rotatably journalled in said sleeve and meshing with said worm wheel, a shaft for said worm, a handle on said worm shaft, and means for clamping said spindle to such crank pin in axial alignment therewith and with said plane end surface of the spindle bearing against the plane end surface of the crank pin, said clamping means comprising an outer brace adapted to support the outer end of said spindle, a second brace adapted to be placed against the wheel, and stay bolts connecting said two braces, and a bearing for said worm shaft slidable on one of said stay bolts.

6. In a grinding apparatus for grinding crank pins and journals on locomotive and railway car wheels, the combination of a spindle having a plane end surface perpendicular to the axis of the spindle, a sleeve slidable longitudinally on said spindle, a support rotatable on said sleeve, a slide supporting a grinding tool movable in said support transversely to the axis of said spindle, a worm wheel attached to said support, a worm rotatably journalled in said sleeve and meshing with said worm wheel, means for rotating said worm, and means for clamping said spindle to such crank pin in axial alignment therewith and with said plane end surface of the spindle bearing against the plane end surface of the crank pin, said clamping means comprising an outer brace adapted to support the outer end of said spindle, a second brace adapted to be placed against the wheel and stay bolts connecting said two braces, a screw rotatably mounted on said outer brace, a nut on said screw, and a link connecting said nut and said sleeve.

JOHAN RICHARD GUSTAFSSON.